April 18, 1967    L. N. FELTON ET AL    3,314,492
APPARATUS FOR WEIGHING FLUIDS
Filed Sept. 29, 1965

INVENTORS
LESLIE NEWMAN FELTON
LEE ALLEN WUETHRICH
BY
Andrus & Starke
Attorneys ated Apr. 18, 1967

3,314,492
APPARATUS FOR WEIGHING FLUIDS
Leslie Newman Felton, Loyal, and Lee Allen Wuethrich, Greenwood, Wis., assignors to Grassland Dairy Products, Inc., Greenwood, Wis., a corporation of Wisconsin
Filed Sept. 29, 1965, Ser. No. 491,136
3 Claims. (Cl. 177—209)

This invention relates to an apparatus for weighing materials and more particularly to an apparatus for weighing cream.

In cheese making and other dairy product industries it is often necessary to weigh cream and determine its butterfat content, for payment to the dairyment is made on the basis of the weight and butterfat content. A scale can be used to weigh the cream, but due to the large volumes and weights involved, a scale of a size necessary to accommodate this weight is relatively costly. Moreover, due to the variable specific gravity of cream, its weight cannot accurately be determined by the dipstick method which is generally used to determine the weight of large volumes of milk. As the specific gravity of milk does not vary appreciably due to the fact that the butterfat content of all milk is generally within a few percentage points, a dipstick method provides a reasonably accurate and inexpensive means for determining the weight of a quantity of milk. However, when dealing with cream, the butterfat content can vary widely, generally in the range of 18 to 60%, with the result that the specific gravity will correspondingly vary so that the dipstick method, which merely measures the depth of the liquid, does not provide an accurate weight measurement of cream.

The present invention is directed to an apparatus for weighing liquid materials of varying specific gravity and more particularly to an apparatus for weighing cream. The apparatus of the invention includes a tank to contain the cream to be measured and a transparent tube is connected to the lower portion of the tank and extends upwardly to a level above the tank. Located in the tube adjacent the tank is a manually operable valve. An indicating liquid, such as water, is located in the tube and a calibrated scale extends along the tube and is provided with a series of graduated marks.

To weigh the cream contained within the tank, the tube is initially filled to the top with water. The valve is then opened and the water will descend within the tube and balance out at a given level. The scale reading corresponding to the water level in the tube can either directly indicate the weight of the cream, or the scale reading can be converted by use of an auxiliary chart or table to the weight of cream.

When the valve is opened, a small amount of water from the tube will enter the tank containing the cream. However, as the water is compatible with the cream, the small amount of water which enters the tank is of no consequence and does not appreciably affect the butterfat content or the measured weight.

The present invention is an inexpensive device which accurately measures large volumes of cream or other liquids of varying specific gravity and can be installed with a standard tank with minimum alteration or reconverson of the tank.

Other objects and advantages will appear in the course of the following description.

The drawings illustrate the best mode presently contemplated of carrying out the invention.

Figure 1:
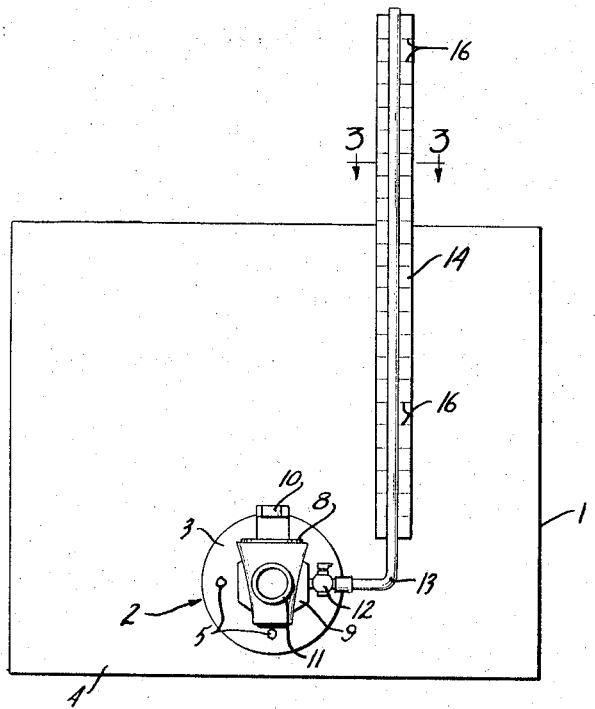
FIG. 1 is a front view of a tank containing the measuring device of the invention.
Figure 2:
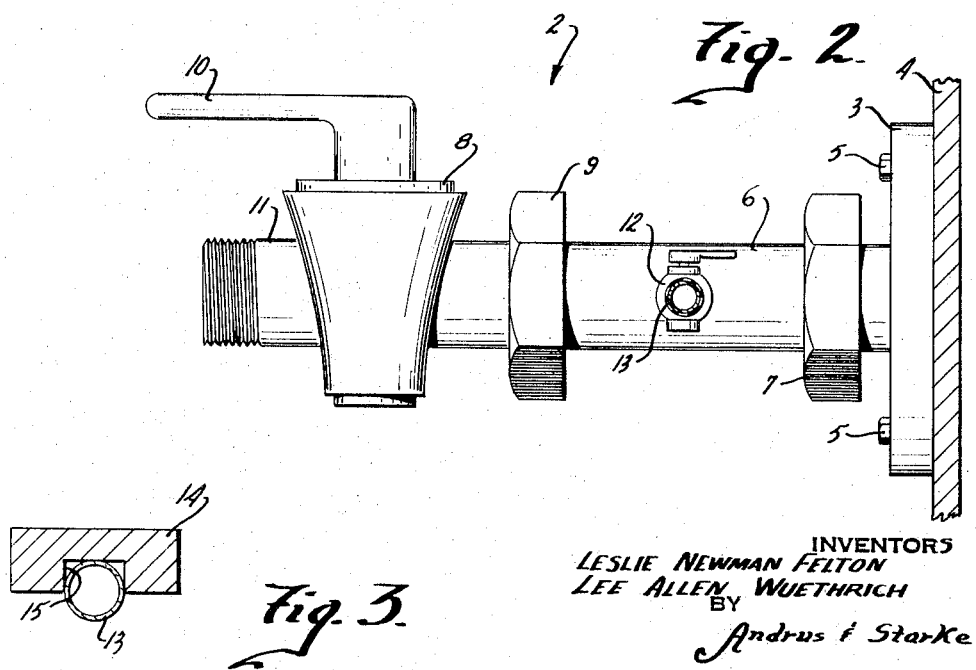
FIG. 2 is an enlarged side elevation showing the connection of the tube and the outlet fitting to the tank.
Figure 3:
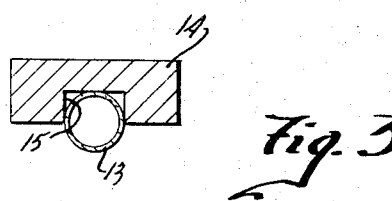
FIG. 3 is a section taken along line 3—3 of FIG. 1.

The drawings illustrate a tank 1 or container which is adapted to contain cream or other material to be weighed. The cream is discharged from the tank through an outlet fitting 2 which is located adjacent the bottom of the tank. As best shown in FIG. 2, the fitting 2 includes a flanged ring 3 secured to an end wall 4 of tank 1 by a series of bolts 5. One end of a pipe section 6 is connected to ring 3 by nut 7 while the opposite end of pipe section 6 is connected to valve member 8 by nut 9. The valve member is manually operated by handle 10 to control the flow of cream or other liquid through the outlet pipe 11.

Secured within an opening in pipe section 6 is a petcock 12 and a transparent tube 13 is connected to the petcock and extends upwardly along the wall 4 of the tank to a level above the tank. The tube 13 is filled with water or other liquid which is compatible with the material being weighed, and a graduated scale 14 is secured to the tank 1 and is provided with a recess 15 which receives the tube 13. The scale 14 is provided with a series of graduated marks 16, and when the petcock 12 is opened, a column of water of given height in tube 13 will balance a weight of material in the tank, and the scale reading or mark 16 corresponding to the balanced water level in tube 13 either provides a direct indication of the weight of the material in tank 1, or the scale reading can be converted to the weight of the material by use of an auxiliary conversion table.

To calibrate the unit, the tank 1 is initially leveled and filled with water. With the valve 8 and petcock 12 closed, the tube 13 is filled with water to its upper end. The petcock 12 is then opened and the water within the tube will descend to a level at which the level of the water within the tube will be at the same height as the level of water in the tank. Thus, as the weight of the water in the tank balances a column of water in the tube 13, the level of the water within the tube is an indication of the weight of the water in the tank. For example, if 3,000 pounds of water balance a column of water in the tube 13 at a given point, that point on the scale would be equal to 3,000 pounds.

Subsequently, a given amount of water is drained from the tank, for example, 50 pounds, and the level of water in the tube 13 is again read. This reading of the water level is thus an indication of the weight of the water in the tank or 2,950 pounds. This procedure is repeated with increments or successive quantities of water being withdrawn from the tank and corresponding readings taken on the scale 14.

After calibration with water, a quantity of cream to be weighed is poured into the tank and the tube 13 is filled with water. The petcock 12 is then opened and the water will descend within the tube 13 and balance out at a given level. If the scale graduations 16 are in pounds or other units of weight measure, the scale reading will give the direct weight of the cream in the tank. On the other hand, if the graduations 16 are merely units of linear measure, then the scale reading will have to be converted by conversion tables to weight measure.

As previously mentioned, it requires a given weight to balance the column of water in tube 13 at a given point and thus a reading of the water level in the tube will provide the weight of the material within the tank regardless of the specific gravity of the material being weighed.

The present invention provides an inexpensive unit which will accuately measure large volumes of liquid, such as cream or the like. The device is particularly well suited for use with materials which may vary in specific gravity so that the conventional dipstick method cannot be employed for determining the weight of the liquid.

While the drawings show the tube 13 being connected to the outlet fitting 2 of the tank, it is contemplated that the tube may be inserted at any location in the lower portion of the tank, although it is preferred to install the tube at a point adjacent the bottom of the tank. Using the tube 13 in conjunction with the standard outlet fitting 2 eliminates the necessity of drilling holes in the tank itself and eliminates the seals which would be required for such holes. Thus, the unit can be adapted to standard tanks without any alteration of the tank itself by merely slightly modifying the outlet fitting.

While the drawings show the use of a calibrated scale to provide an indication or measurement of the level or height of the water in tube 13, it is contemplated that electrical probes or other liquid sensing means can also be employed to provide an indication of the water level in the tube.

Various modes of carrying out the invention are contemplated as being within the scope of the following claims particularly pointing out and distinctly claiming the subject matter which is regarded as the invention.

We claim:

1. A device for measuring the weight of a liquid material, comprising a tank to contain the liquid material to be weighed, a tube having one end connected to the bottom portion of the tank and extending upwardly along the tank with the opposite end being located above the level of liquid material in the tank, valve means located in the tube adjacent the tank, said valve means being movable from an open to a closed position and when said valve means is in the open position the interior of the tube being connected directly to the interior of the tank, an indicating liquid different from the liquid material to be weighed and contained within the tube, and means for providing an indication of the level of the liquid in the tube, the upper level of the indicating liquid in the tube being above the upper level of the liquid material in the tank when said valve means is in the closed position so that a portion of said indicating liquid will flow from said tube into said tank when said valve means is open and the remaining portion of the indicating liquid in said tube will be balanced by the weight of the liquid material in said tank to provide an indication of the total weight of the liquid material.

2. The device of claim 1 in which said tube is generally L-shaped and said opposite end of the tube is open to the atmosphere.

3. A device for measuring the weight of a bulk quantity of cream, comprising a tank to contain the cream to be weighed, outlet conduit means connected to the lower portion of the tank and including a first valve member to open and close said outlet conduit means, a tube having one end connected to said conduit means between the tank and the first valve member, a second valve member located in said tube adjacent said conduit means, said tube extending substantially vertically along the exterior of the tank and the upper end of the tube being open and located at a level above the top of the tank, said tube containing a quantity of water, and a calibrated scale located adjacent the tube on the exterior of the tank, the upper level of the water in said tube being above the upper level of cream in said tank when said second valve member is closed so that a portion of the water will flow from said tube into said tank when said second valve member is opened and the remaining portion of the water in said tube will be balanced by the weight of the cream in said tank to provide an indication of the total weight of the cream.

References Cited by the Examiner

UNITED STATES PATENTS

| 2,052,116 | 8/1936 | Strauss | 177—209 |
| 2,231,781 | 2/1941 | Swerdloff | 73—438 |

FOREIGN PATENTS 345,696  1/1937  Italy.

RICHARD B. WILKINSON, *Primary Examiner.*

G. H. MILLER, *Assistant Examiner.*